United States Patent [19]

Janson

[11] 4,445,058

[45] Apr. 24, 1984

[54] HYSTERESIS TENSIONING DEVICE

[75] Inventor: Gunnar H. Janson, Dudley, Mass.

[73] Assignee: Dana Corporation, Toledo, Ohio

[21] Appl. No.: 390,010

[22] Filed: Jun. 21, 1982

[51] Int. Cl.³ .......................................... H02K 49/00
[52] U.S. Cl. ..................................... 310/103; 310/92; 310/105
[58] Field of Search ................... 310/92, 93, 103, 105, 310/268

[56] References Cited

U.S. PATENT DOCUMENTS

| | | | |
|---|---|---|---|
| 2,601,961 | 7/1952 | Stephenson | 310/93 |
| 4,152,617 | 5/1979 | Janson | 310/92 X |
| 4,186,320 | 1/1980 | Hillman | 310/93 |
| 4,381,466 | 4/1983 | Laenens | 310/103 |

*Primary Examiner*—Donovan F. Duggan
*Attorney, Agent, or Firm*—F. B. McDonald; R. M. Leonardi

[57] ABSTRACT

A hysteresis tensioning device 10 incorporates an improved apparatus for setting and maintaining an air gap 48 between a hysteresis ring 32 and a magnet 36. The hysteresis ring operates in a fully saturated magnetic force field, and is thus amenable for tension control in environments subject to wide temperature variations. To the extent that magnetic tape recording is involved, the apparatus incorporates the use of magnets which are structured for being fixed relative to magnetic tape heads associated therewith, whereby any associated flux leaks are of the direct current type only. In a preferred embodiment, the device includes a pulley assembly 12 rotatably mounted on a bearing 20 having an inner race 22 supported on an axially disposed pulley shaft 16. The assembly includes a hysteresis ring 32 bonded to one side of a pulley sheave 18, the ring being axially spaced with respect to a magnet 36, whereby an air gap 48 is defined therebetween. The magnet is part of a magnet assembly 14 which, in turn, includes an axially extending member 40 supported on the shaft, and spaced by shims 46 from a radial surface 44 of the aforementioned inner race. The shaft includes an axial bore 50 and the magnet assembly includes a coupling member 52 cooperating with the bore for securing the axially extending member against the shims, wheeby the air gap may be accurately set and maintained.

10 Claims, 1 Drawing Figure

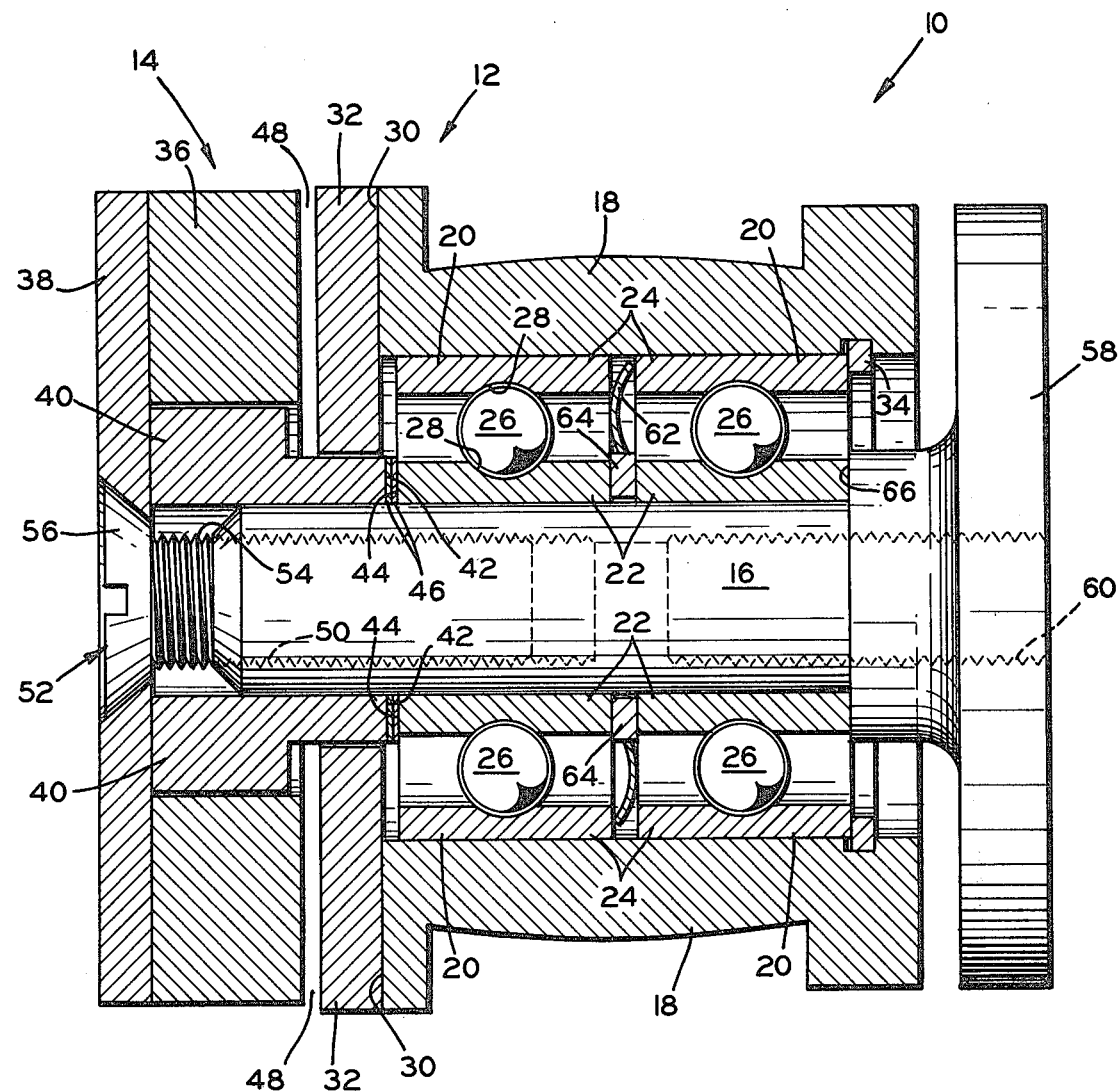

HYSTERESIS TENSIONING DEVICE

BACKGROUND OF THE INVENTION

This invention relates to tensioning devices as utilized in maintaining constant torque on pulley assemblies employed in the movement of tapes or strands. More particularly, the invention relates to tensioning devices which include a permanent magnet and a hysteresis flux ring, wherein as the hysteresis ring rotates, the poles of the magnet generate a "drag" or retarding torque on the pulley assembly.

Of critical importance to the satisfactory operation of such devices is the setting and maintenance of an air gap or spacing between the hysteresis ring and the magnet. Air gap adjustment mechanisms in prior devices have been complex, bulky, and difficult to maintain. Also particularly in aviation and outer space applications, size and weight limitations have generated a specific need for compactness in tension control devices. To date, such requirements have been met through the use of miniature friction clutches, which are unreliable and subject to high failure rates due to wear of parts.

Also of particular concern in aviation and outer space applications are the wide temperature variations encountered. In traditional hysteresis tensioning devices, the hysteresis ring has operated in an unsaturated magnetic state or condition, resulting in performance quite sensitive to temperature. As a result the drag or resistance torque on the pulley assemblies employed in such systems has been variable as a function of temperature to an objectionable degree. Although it has been known that a fully saturated magnetic condition would alleviate the problem, the state of the art has been such that materials for magnets and hysteresis rings have not been suitable for practical use in the latter environments.

Finally, as to use of magnetic tape in tape recording devices, the avoidance of alternating magnetic flux leakage becomes critical whenever magnets are rotated relative to the magnetic tape heads employed in such systems. The movement of the magnets produces extraneous and objectional tape noise due to generation of alternating magnetic flux within the system. Fixation of the magnets relative to the heads would avoid magnetic movement relative to such heads, and thereby result in systems experiencing only non-cyclic or constant magnetic flux leakage, the latter of which is not disruptive.

SUMMARY OF THE INVENTION

The hysteresis tensioning device of this invention incorporates an improved structure for setting and maintaining an air gap between a hysteresis ring and a magnet. The magnet is made of rare earth materials and the hysteresis disc is made of a high hysteresis loss material to ensure a high torque to weight ratio. The disc is sized and positioned relative to the magnet to ensure rotation thereof in a fully saturated magnetic state. As such, the operation of the device is suitable for environments in which wide temperature variations are encountered. Also suitable for use in magnetic tape recording systems, the magnet is disposed for being fixed relative to magnetic tape heads and thus allows only constant magnetic flux leakage to avoid the "noise" associated with alternating magnetic flux leakage.

In a preferred embodiment, the device includes a pulley assembly having a hysteresis ring bonded to one side thereof. The assembly is rotatably mounted on a bearing having an inner race supported on an axially disposed pulley shaft. A magnet assembly is fixed to the shaft, and includes a samarium cobalt magnet disposed in an axially spaced relationship with the hysteresis ring to define an air gap between the magnet and ring. The magnet assembly includes an annular sleeve, whereby annular shims may be placed over the shaft between the inner race and sleeve to effect an adjustment of the air gap. The pulley shaft includes a threaded axial bore by which the magnet assembly may be threadably secured to the shaft for maintaining a desired air gap setting. The pulley shaft in turn is disposed for affixation to a non-movable structure, for example the housing of a tape recording apparatus.

BRIEF DESCRIPTION OF THE DRAWING

The drawing FIGURE is a cross sectional view of a hysteresis tensioning device, which incorporates improved apparatus for setting and maintaining an air gap adjustment.

DESCRIPTION OF THE PREFERRED EMBODIMENT

Referring to the drawing, a hysteresis tensioning device 10 incorporates the present invention. The device 10 includes a pulley assembly 12 and a magnet assembly 14, both supported on a pulley shaft 16. The pulley assembly is rotatable on the shaft, while the magnet assembly is fixed thereon. The pulley assembly 12 includes a pulley sheave 18 supported on left and right bearings 20 for rotation about the shaft 16. In the preferred embodiment shown, the bearings 20 are ball bearings which include inner and outer races 22 and 24, respectively, in addition to balls 26 which rotate in grooves 28 of the races. Although in the preferred embodiment two such bearings are employed, any number of such bearings 20 could be employed depending on the desired width of the pulley and certain other feasibility factors as will be appreciated by those skilled in the art.

Rigidly affixed to a side wall 30 of the sheave 18 is hysteresis flux ring 32, which rotates with the pulley sheave on the bearings 20. A snap ring 34 axially secures the pulley sheave 18 over the bearings 20, as further explained hereinafter.

The magnet assembly 14 includes a permanent magnet 36 which is affixed to a flux backing plate 38 for support. The magnet is comprised of rare earth materials, preferably samerium cobalt. Positioned annularly over the shaft 16 and radially inwardly of the magnet 36 is an axially extending member, which in the preferred embodiment is an annular sleeve 40. The sleeve 40 is a non-magnetic member, and in the preferred embodiment is of a non-magnetic stainless steel. For convenience, the sleeve 40 is affixed to the backing plate 38 by a bonding adhesive, although the sleeve may alternatively be left unsecured to the plate 38. Both the sleeve 40 and the inner race 22 next adjacent thereto have radially extending surfaces 42 and 44 respectively, which are spaced axially with respect to each other. The preferred means for spacing the two radially extending surfaces comprises a set of annular shims 46 which may be added or removed as necessary to effect desired adjustment of an air gap 48 between the magnet 36 and hysteresis disc 32 as shown. The shaft 16 includes a threaded bore 50 into which extends a threaded portion 54 of a flat head screw 52, or other coupling member, which includes a head 56, the threaded portion 54 being mateably engagable with the internal bore 50 of the shaft 16. The head 56 engages the backing plate 38 for forcing the plate against the sleeve 40, which in turn bears against the shims 46 and inner races 22 for maintenance of the desired air gap 48. For this purpose, the physical connection between the shaft 16 and the coupling member 52 is preferably axially adjustable.

The inner races 22 of the left and right bearings 20 are spaced by a flat washer 64 for achievement of proper dimensional spacing between the bearings 20. As can be noted, the inner race 22 of the right bearing 20 bears against a thrust shoulder 66 which carries all axial forces imparted through the bearing inner races 22. In the preferred embodiment a preload spring, preferably a wave spring washer 62, is employed to avoid axial slip or looseness between the outer races 24 of the bearings 20, as will be fully appreciated by those skilled in the art.

While the snap ring 34 provides a leftward limit for axial movement of the pulley sheave 18, the magnetic attraction force of the magnet 36 on the hysteresis ring 32 will effectively prevent any rightward movement of the sheave 18. Thus, the snap ring 34 will carry the attraction force of the magnet 36 through the sheave 18, and should accordingly be designed with appropriate capacity to carry such load over the useful life of the hysteresis tensioning device 10.

In order that the practice of this invention may be more fully understood, a preferred construction of the tensioning device 10 is now explained as follows. First the pulley assembly 12 is formed by bonding the hysteresis disc 32 to the side 30 of the sheave 18. After the bond is cured, the left bearing assembly 20 is inserted into the newly formed disc-sheave unit, followed by insertion of the flat washer 64 and wave spring washer 62. The right bearing assembly 20 is next inserted, and held against the force of the wave spring washer until the snap ring 34 is installed. This completes the construction of the bearing assembly 12.

The assembly 12 is next installed over the pulley shaft 16 until the inner race 22 of the right bearing 20 bottoms against the thrust shoulder 66. Shims 46, preferably comprised of annular flat steel rings (as shown) and having known or premeasured thicknesses, are next installed over the shaft 16 against the radially extending surface 44 of the inner race 22 of the left bearing 20. The magnet assembly 14, comprised of the annularly shaped permanent magnet 36 and sleeve 40, both bonded to the backing plate 38, is then inserted over the shaft 16, until the radially extending surface 42 of the sleeve 40 contacts the shims 46. Finally, the flat head screw 52 is threaded into the bore 50 of the shaft 16 for securement of both magnet and pulley assemblies to the shaft 16. The air gap 48 is adjusted by removal or addition of shims 46. The gap is preferably adjusted to a magnitude in the range of five to fifteen thousandths of an inch.

As earlier mentioned, when hysteresis tensioning devices are employed in magnetic recording tape systems, the magnetic tape heads utilized therein can be undesirably subjected to alternating magnetic flux leakage. Such leakage occurs as a result of relative movement of the magnets with respect to such heads, and creates "noise" patterns over the recordings. The device 10 of the present invention contains a pulley flange 58 which is disposed for securement of the pulley shaft to the housing of the device, or to some other structure which is fixed relative to such tape heads. For this purpose a bore 60 extends into the flange 58, the bore being threaded, or otherwise disposed for mechanical securement to the tape recorder housing. As the magnet assembly 14 is fixed to and does not rotate on the shaft 16, the use of the flange 58 and bore 60 ensures the non-rotation, or non-movement, of the poles of the magnet 38 relative to any magnetic tape heads within the system. Thus, to the extent that there will generally be uncontrollable flux leaks, such leaks will be of the direct current type only, and the tape noise factors otherwise encountered will be avoided.

As the pulley assembly 12 rotates about the bearings 20, the hysteresis ring 32 moves in the magnetic field produced by the poles of the stationary magnet 36. As such, the ring 32 (and hence the sheave 18 affixed thereto) will be subjected to a resistance torque induced by rotation thereof in the magnetic field. As will be appreciated by those skilled in the art, the magnitude of such magnetically induced torque is a function of such factors as the strength of the magnet, the number of poles in the magnet, the dimensional spacing between the hysteresis ring and the magnet, as well as the materials of both magnet and hysteresis disc. In the preferred embodiment of the tensioning device of this invention, particularly wherein magnetic tape is employed, the hysteresis disc operates preferably in a fully saturated magnetic state. As is well known, at full saturation the hysteresis performance is considerably less subject to environmental temperature variations.

To effect such a preferred magnetic condition, the magnet is made of a rare earth material, preferably of samarium cobalt, and the hysteresis ring is preferably made of a high hysteresis loss material, as for example a material comprising 8% aluminum, 14% nickel, 24% cobalt, 3% copper, and 49% iron. Also, the ring 32 is sized relative to the magnet so that its extremities fall within the field of the magnet 36.

The embodiment described and explained herein is not fully dispositive of the many variations envisioned hereunder, and as covered by the appended claims.

What is claimed is:

1. In a tensioning device for maintaining a constant torque on a pulley assembly, said pulley assembly including a hysteresis ring, said assembly being rotatably mounted on a bearing having an inner race supported on an axially disposed pulley shaft, said race including a first radially extending surface, the tensioning device further including a magnet assembly having a magnet disposed in an axially spaced relationship with the hysteresis ring to define an air gap between said magnet and said ring; an improvement comprising:
   a. said magnet assembly including an axially extending member supported on said shaft, the member having a second radially extending surface, said first and second surfaces being axially spaced apart,
   b. spacing means for holding said surfaces in spaced relationship,
   c. said pulley shaft including an axial bore therethrough, and
   d. said magnet assembly having means cooperating with said bore for retaining said axially extending member against said spacing means to hold a setting of said air gap.

2. The tensioning device of claim 1 wherein said pulley shaft includes a shoulder, and said axially extending member holds said spacing means against said bearing inner race, wherein said race is restricted from axial movement by said shoulder.

3. The tensioning device of claim 2 wherein said means for holding said axially extending member against said spacing means comprises a coupling member adjustably connected to said shaft.

4. The tensioning device of claim 3 wherein said magnet assembly includes a flux backing plate in contact with said axially extending member, wherein said coupling member bears against said backing plate to force said axially extending member toward said shoulder through said spacing means and bearing race.

5. The tensioning device of claim 4 wherein said shaft is disposed for affixation to a stationary member, and wherein said magnet assembly is non-rotatably fixed to said shaft, whereby all poles of said magnet are fixed relative to said shaft, whereby all flux losses are of direct current type only.

6. The tensioning device of claim 5 wherein said magnet comprises rare earth materials, wherein said hysteresis ring is of a high hysteresis loss material, and said magnet produces a saturated magnetic condition through said hysteresis ring.

7. The tensioning device of claim 6 wherein said magnet comprises samarium cobalt, and wherein said hysteresis ring comprises in approximate amounts: 8% aluminum, 14% nickel, 24% cobalt, 3% copper, and 51% iron.

8. The tensioning device of claim 7 wherein said spacing means for retaining said first and second surfaces in spaced relationship comprises annular shims.

9. The tensioning device of claim 8 wherein said pulley assembly comprises at least two bearings including at least two outer races, said assembly further including a bearing preload spring, wherein said preload spring is disposed between said outer races.

10. The tensioning device of claim 9 wherein said preload spring comprises a wave washer.

* * * * *